Figure 1:
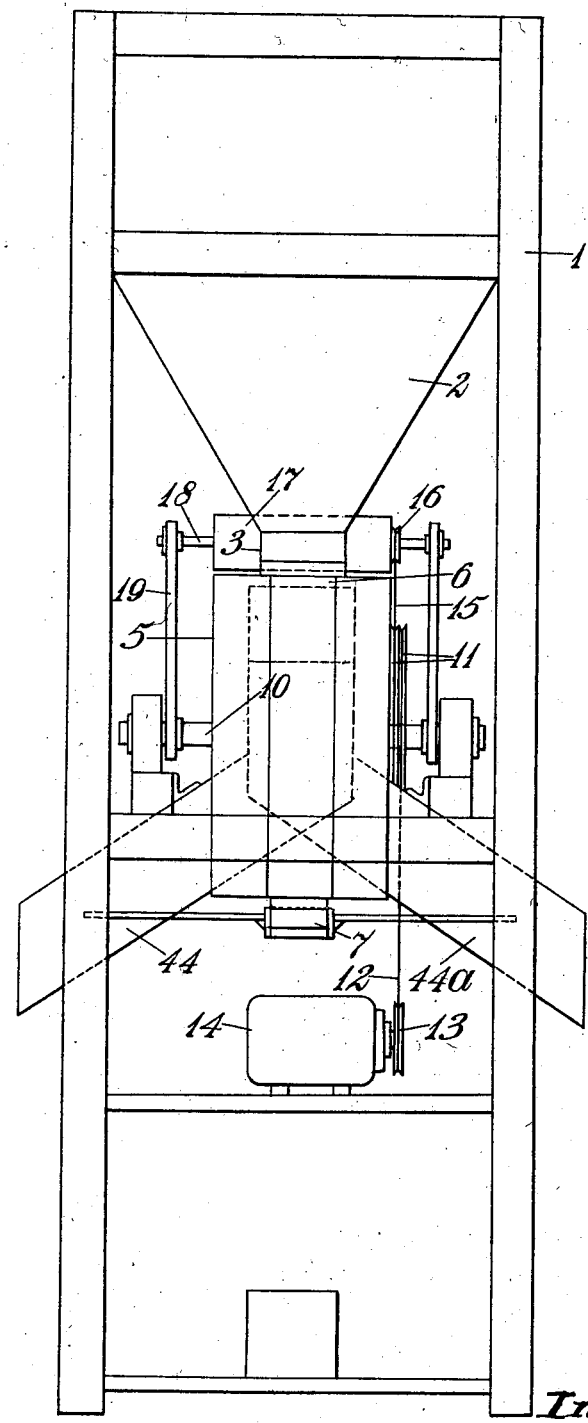

Aug. 14, 1945.          T. A. OXLEY ET AL          2,382,168
           APPARATUS FOR SORTING GRANULAR MATERIAL
                 ACCORDING TO ITS MOISTURE CONTENT
                    Filed Feb. 19, 1944          5 Sheets-Sheet 1

Inventors
T. A. Oxley
F. R. Henderson

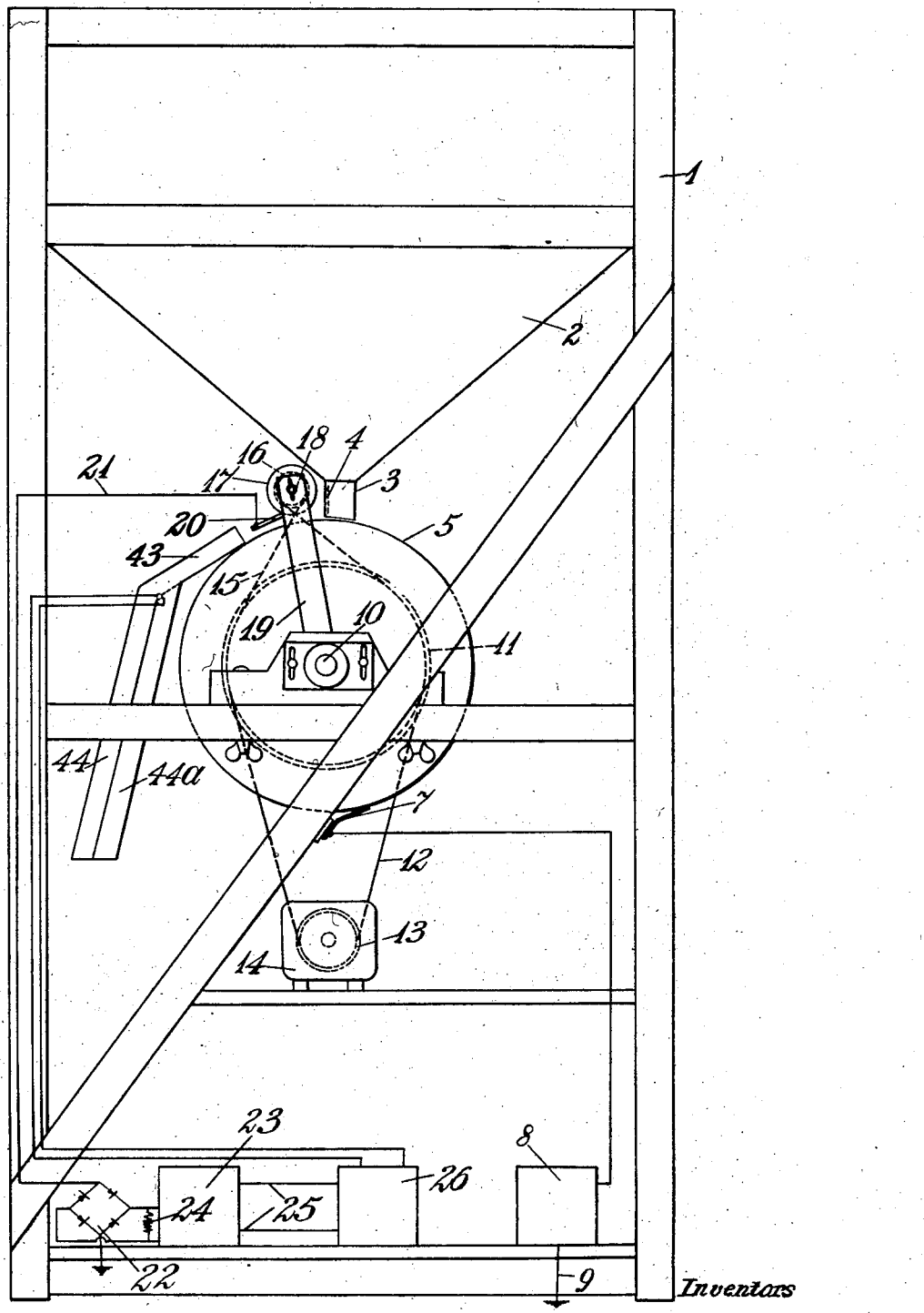

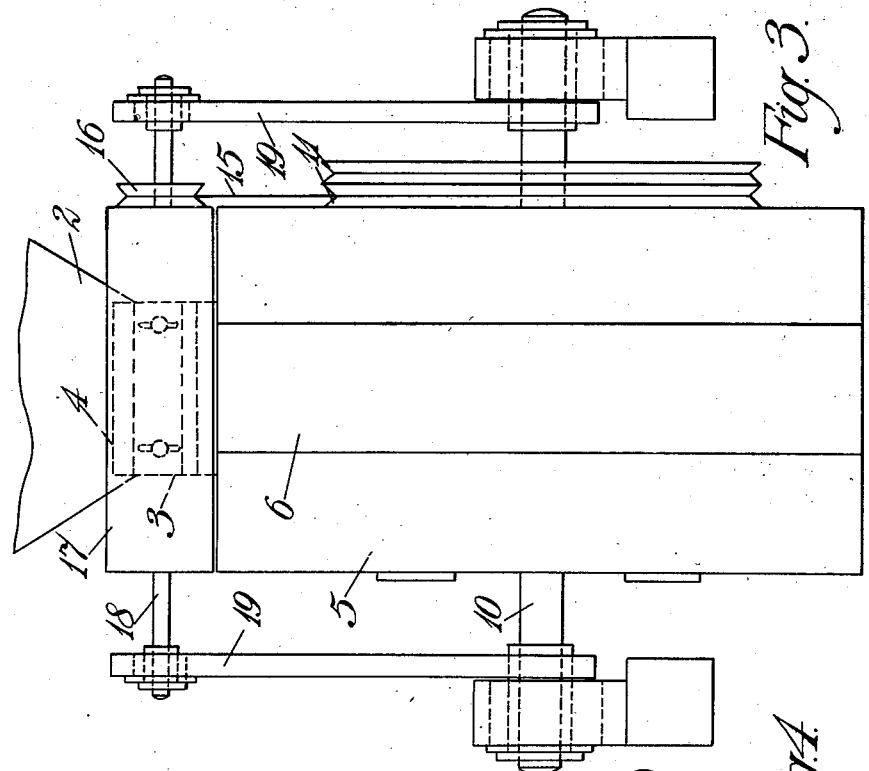
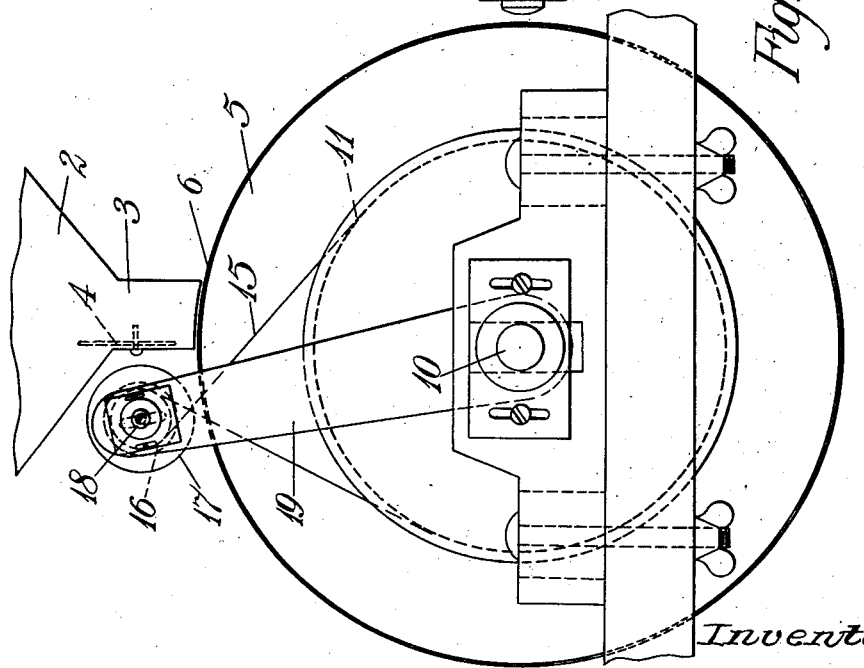

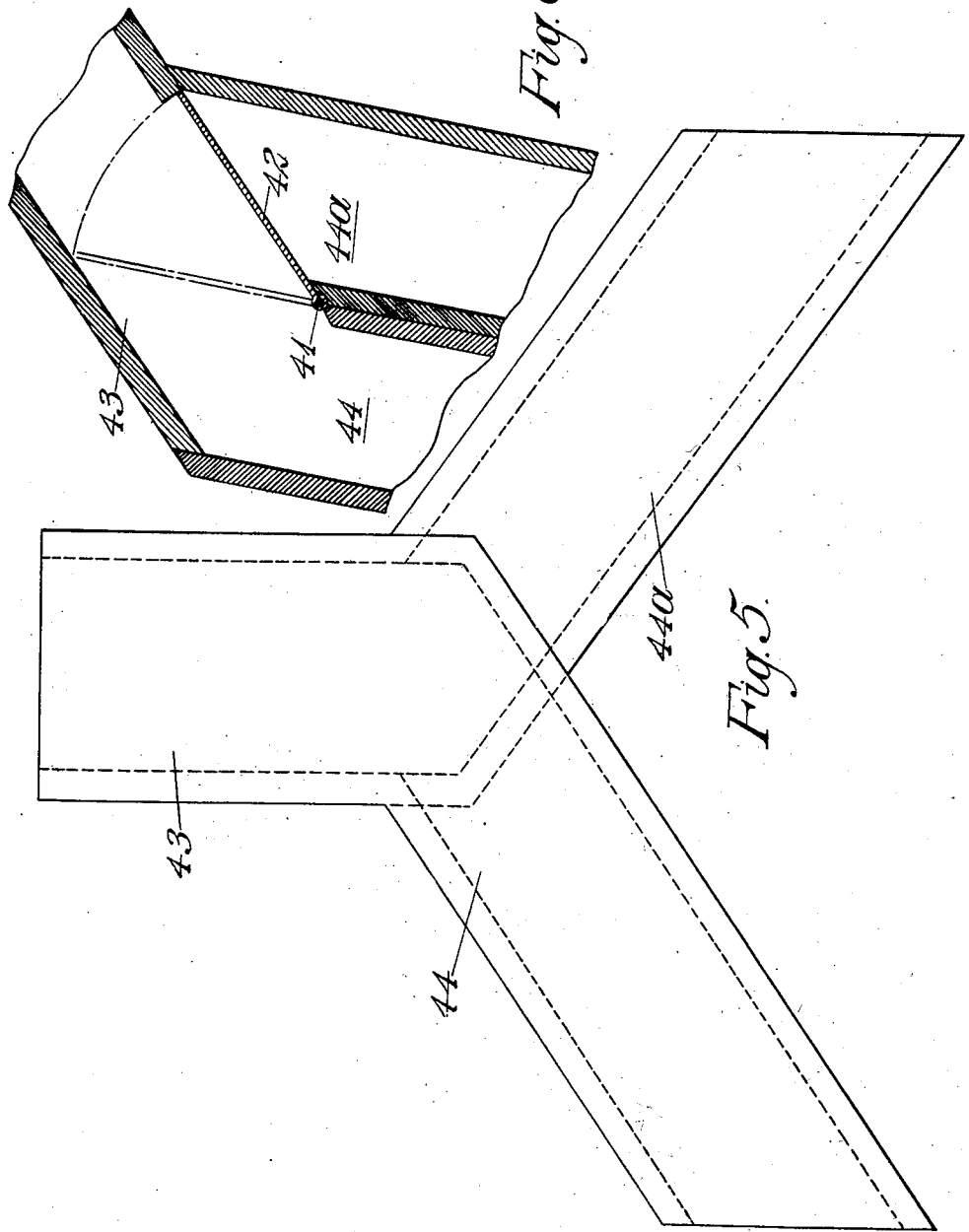

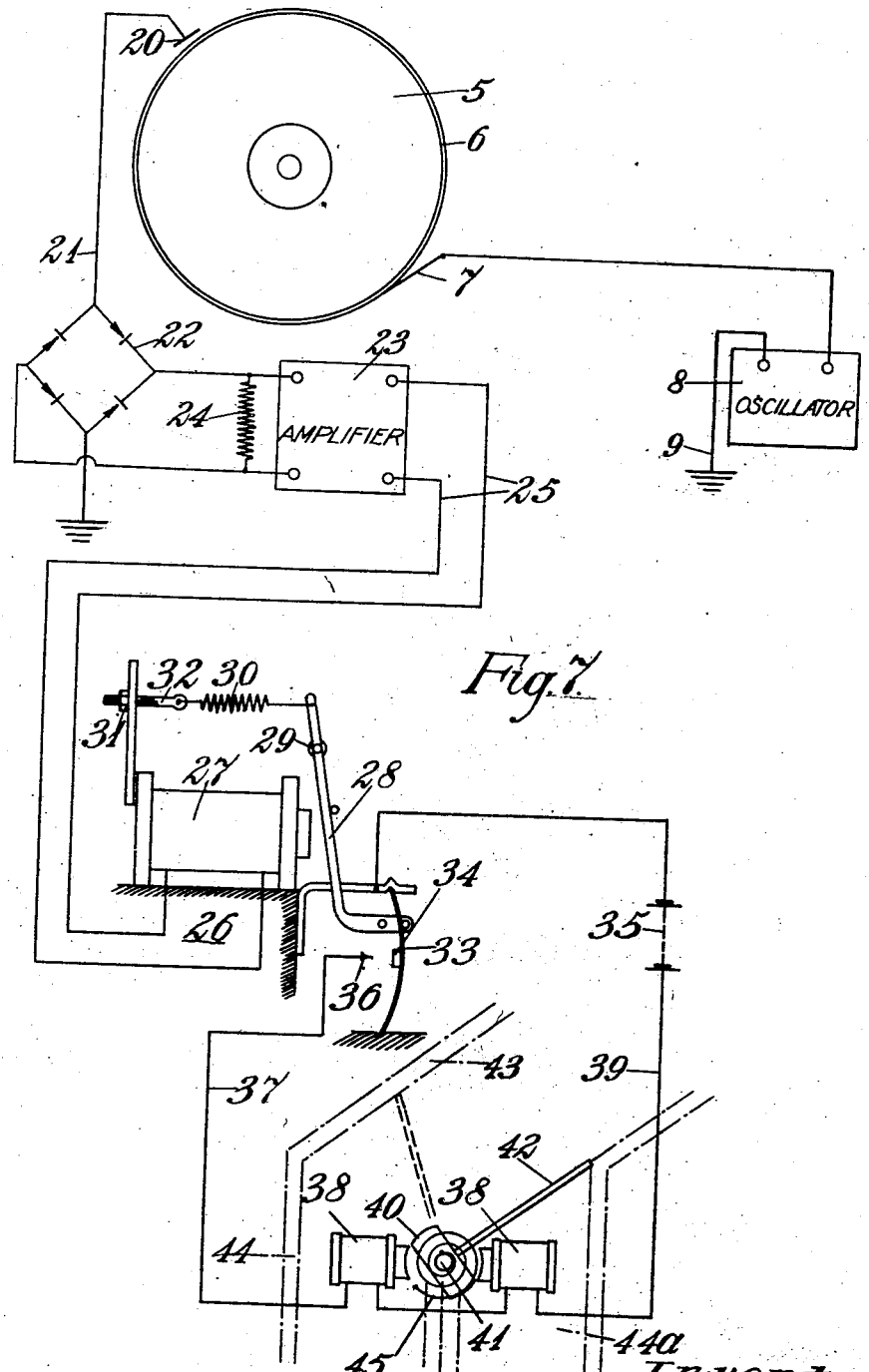

Patented Aug. 14, 1945

2,382,168

UNITED STATES PATENT OFFICE 2,382,168

APPARATUS FOR SORTING GRANULAR MATERIAL ACCORDING TO ITS MOISTURE CONTENT

Thomas Alan Oxley and Frank Young Henderson, Slough, England

Application February 19, 1944, Serial No. 523,152
In Great Britain December 17, 1943

1 Claim. (Cl. 209—81)

This invention relates to sorting granular material according to its moisture content.

For many purposes it is desirable or necessary to sort granular material according to its moisture content. For example heating and the development of fungi in cereal grain during storage depends very largely on moisture content. It has been found, further, that the average moisture content of a large mass of grain is no criterion, as the content often varies locally to a very considerable extent. It becomes desirable therefore to examine the whole or a carefully selected sample of a batch to be stored, and the object of the present invention is apparatus which will enable this to be done rapidly and automatically and at the same time will if desired also sort the material according to its moisture content.

It is well known that moisture content affects various electrical properties of a granular material, such as capacitance, resistance, and impedance to high frequency currents. Numerous moisture meters have been based on this observation and the present invention also makes use of it.

In order to deal with the whole of a mass of grain, or a sample which is sufficiently typical of the whole, the whole of the grain is carried in a stream by a conveyor and the whole of this stream or part thereof is carried between electrodes which constitute a condenser and/or conductive contacts, the conveyor travelling at a generally constant speed and the grain being supplied thereto by means which maintain a constant cross section at the point of supply. To avoid averaging considerable variations this cross section is made relatively small. If only part of the stream is examined, this part may be diverted from the main stream during its passage between the electrodes.

This alone is not sufficient to ensure an accurate determination because the water content affects the packing factor of a granular material so delivered. Wet cereal grains, in particular, pack more loosely than dry grains so that a stream of wheat of constant thickness and width will often contain a markedly less volume of damp particles per unit length than of dry particles. The difference may easily exceed the difference in water content so that a stream of damp grain may contain less water per unit length than a stream of dry grain of the same width and thickness.

To ensure a constant packing factor, we pass the grain on the conveyor, at a point between its delivery to the conveyor and the electrodes, beneath means which compress the thickness of the stream, the stream being free to spread laterally. In this way a constant packing factor can be attained without the deformation of the grains. This constant packing is only attained over the central part of the stream and the electrodes are therefore made narrow enough to deal only with this portion. The electrodes should come closely after the packing means as vibration quickly disturbs the packing effect.

The moisture content may simply be indicated by a suitable circuit and instrument and the necessary or desired routing of the granular material controlled by hand, or the indicating current may be used, if necessary after amplification, to actuate suitable routing means.

Summarising, the invention comprises therefore, the combination of a conveyor travelling at predetermined, generally constant, speed, means for feeding a stream of granular material of predetermined cross section to the conveyor, means for compressing the stream sufficiently in thickness, while leaving it free laterally, to obtain a constant packing factor, electrodes immediately succeeding the compressing means and of such size as to co-operate with the central portion only of the stream and indicating or routing means electrically actuated by circuits including said electrodes and the portion of the stream co-operating with the electrodes.

The conveyor must be horizontal or nearly so and may comprise the surface of a disc, a band or, preferably, a revolving drum.

The granular material may be fed on to the moving surface by a vertical spout or gate and its thickness regulated by a plate placed across the mouth of the spout so as to leave a rectangular space of suitable thickness between its lower edge and the moving surface.

The packing device preferably immediately succeeds the spout or the like and may take the form of a highly polished stationary surface, sloping downwards in the direction of travel of the stream of grain. The surface may be plane or may be curved so that its slope decreases in the direction of travel of the grain. We prefer, however, to use a roller placed with its axis horizontal and at right angles to the direction of flow of the stream. The height of the roller above the moving surface must be less than the thickness of the stream so that the roller compresses the stream and reduces its thickness to that finally required for the measurement to be made. Usually it is necessary for the roller to be driven so that its peripheral speed is equal to that of the moving surface. It is not sufficient to allow the roller to be driven by the stream itself by friction.

When the stream of granular material leaves the spout at a regulated height, packing is determined by the chance arrangement of the particles, their weight, and their friction on each other. When the stream passes under the packing device it becomes thinner and wider so that grains are compelled by forces relatively much greater than their own weight to move in relation to each other. They are thus forced into the closest packing arrangement, compatible with their not being deformed, which can be arrived at from their original chance arrangement. Forces sufficient to deform the particles should not be reached if the stream is free to expand laterally and is not too wide. The maximum permissible width will depend on the thickness of the stream and on the friction of the particles on each other. It will be understood that on account of the necessary lateral freedom, constant regular packing is only produced in the central part of the stream. The edges are not regularly packed.

By way of example in the case of wheat grains the conveyor may be a drum 15 inches in diameter rotating at 30 R. P. M. The reduction in thickness of the stream may be of the order of 10–15 per cent., and with a stream of about ¾ inch in thickness, a roller of 2½ inches in diameter may be used as the packing device.

If the conveyor is of electrically conductive material it may be used as one electrode, and only one separate electrode, placed above the stream, is necessary. We may, however, use two electrodes, one placed beneath a non-conducting conveyor and the other above the stream, or we may use two electrodes placed above the stream.

Any convenient known circuit may be used. We have found that in the case of cereal grain, sufficiently accurate results can be obtained by applying an alternating potential of constant, high frequency (e. g. 120 kilocycles per second) to one plate, and using the current passed to earth from the other plate to control the separating mechanism through a relay. The separating mechanism can be of any convenient known kind, such as a hinged metal plate which diverts the stream of grain to any of a number of chutes according to the current passing through a spring-loaded solenoid or an equivalent electromagnetic device. For many purposes two chutes are sufficient, i. e., the stream is divided into two portions respectively above and below a predetermined moisture content.

If an indicator or separator of greater precision is needed, other circuits may be used.

A construction of apparatus in accordance with the invention is illustrated by way of example in the accompanying drawings, in which:

Figure 1 is a view in front elevation, and
Figure 2 is a view in side elevation of the apparatus.
Figures 3 and 4 are respectively views in front and side elevation on a larger scale showing certain details.
Figures 5 and 6 are corresponding views of a further detail, namely the chutes by which the separated materials are led away, and
Figure 7 is a wiring diagram illustrating the connections between the electrical components of certain mechanical elements of the apparatus.

Supported by the frame-work 1 (see Figures 1 and 2) is a hopper 2 furnished with a vertical spout 3 with which is associated a slide 4 adapted to regulate the rate at which the granular material is delivered to the surface of the conveying drum 5 which is encircled by a copper or brass plate 6 with which co-operates a brush 7 connected with an oscillator 8 provided with an earth lead 9.

The drum 5 is secured on a shaft 10 and on the shaft there are secured grooved pulleys 11, with one of which is associated a driving belt 12 engaging the pulley 13 of a motor 14 by which the drum is rotated, the other of the grooved pulleys being connected by a crossed belt with a pulley 16 associated with a roller 17 secured to a spindle 18 mounted in bearings on brackets 19 which is driven at the same surface speed as the drum.

The roller 17 operates to compress the stream of material issuing from the hopper and supported on the drum while leaving it free laterally in order to obtain a constant packing factor for the granular material which is passed in consequence of the rotation of the drum 5 below an electrode 20. This electrode is connected by a lead 21 with a rectifier 22 connected across the input of an amplifier 23 which is shunted by a resistance 24, the output of the amplifier being connected by leads 25 with a relay 26 comprising an electromagnet 27, an armature 28 mounted on a pivot 29 furnished with a spring 30 which may be adjustably tensioned by manipulation of a nut 31 on a bolt 32. The armature is connected with a toggle spring 33 furnished with a movable contact 34 to which is connected one pole of a source of direct current 35 and co-operating with a fixed contact 36 connected through a lead 37 with the windings of a pair of electro-magnets 38 in turn connected by the lead 39 with the source of current 35.

Between the pole pieces of these electro-magnets is arranged an armature 40 on a spindle 41 which forms the pivot of a hinged metal plate 42 which is positioned as illustrated more clearly in Figure 5 at the point where the chute 43 divides into chutes 44 and 44a.

With the spindle 41 is associated a spring 42 adapted to bias the hinged metal plate into one position while permitting it as the result of the energising of the electro-magnets and their consequent action upon the armature to move into the second position as shown in dotted lines where the passage of material to the other of the two chutes will be ensured.

As will be understood, when the current passing to earth through the body of material between the drum and the electrode 20 is relatively great due to the excessive humidity of the material, the electro-magnet of the relay will be energised with the result that a local circuit will be completed from the source of direct current 35 through the electro-magnets, thereby causing the magnetic field set up to impart motion to the armature in displacing the spindle to which it is secured in opposition to the action of the spring.

We claim:

Apparatus for sorting granular material according to its moisture content comprising in combination a conveyor travelling at a predetermined speed, means for feeding a stream of granular material of predetermined cross-section to the conveyor, means for compressing the stream sufficiently in thickness, while leaving it free laterally to obtain a constant packing factor, electrodes immediately succeeding the compressing means in the path of the stream of material and of such size as to cooperate with the central portion only of the stream, connections between the electrodes and an electric circuit and means in the electric circuit adapted to distinguish successive portions of such material in accordance with variations in the electrical properties of the material passing between the electrodes due to variations in its moisture content.

THOMAS ALAN OXLEY.
FRANK YOUNG HENDERSON.